Jan. 21, 1941. H. W. LORD Re. 21,697

ELECTRIC VALVE TRANSLATING CIRCUIT

Original Filed March 12, 1936 2 Sheets-Sheet 1

Inventor:
Harold W. Lord,
by Harry E. Dunham
His Attorney.

ELECTRIC VALVE TRANSLATING CIRCUIT

Original Filed March 12, 1936 2 Sheets-Sheet 2

Inventor:
Harold W. Lord,
by Harry E. Dunham
His Attorney.

Reissued Jan. 21, 1941

Re. 21,697

UNITED STATES PATENT OFFICE 21,697

ELECTRIC VALVE TRANSLATING CIRCUIT

Harold W. Lord, Schenectady, N. Y., assignor to General Electric Company, a corporation of New York Original No. 2,141,922, dated December 27, 1938, Serial No. 68,478, March 12, 1936. Application for reissue November 16, 1939, Serial No. 304,819

13 Claims. (Cl. 175—363)

Figure 1:
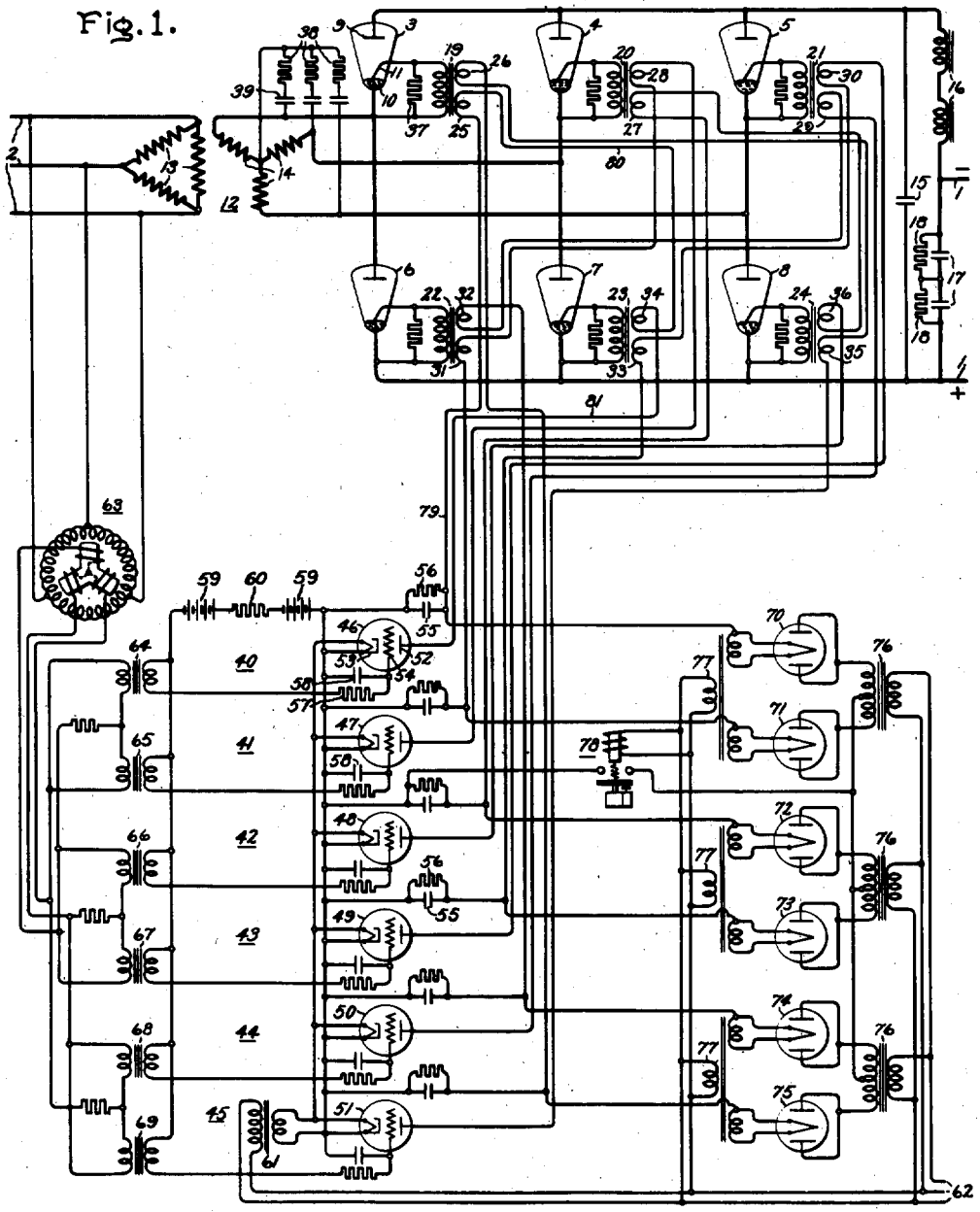

My invention relates to electric valve translating circuits, and more particularly to control circuits for electric valves of the gaseous type.

In electric valve circuits, it is desirable to assure positive and reliable starting and control under various operating conditions. It is frequently of importance in electric valve converting apparatus to render certain pairs or groups of valves conductive at the same time in order to obtain the proper starting and sequential operation. In some electric valve circuits in order to obtain the proper energization of the valves under various load conditions, it is necessary to render a particular pair or group of valves conductive by continuous or intermittent energization during predetermined intervals to assure proper starting and the desired sequential operation. There has been evidenced a decided need for control or excitation circuits to control the conductivity of electric valves of the gaseous or vapor type where these valves are used in translating circuits employing a plurality of electric valves and which are arranged to be energized individually or in certain groups. For example, in electric valve systems for energizing a direct current load circuit from a polyphase alternating current supply circuit by means of a polyphase full wave electric valve rectifier, it is necessary that at least two of the valves conduct current simultaneously in order to establish a circuit through the electric valve converting circuit. When the rectifier is supplying current to a circuit having an initial admittance which is predominately capacitive, the current may not persist for an interval equal to the normal period of conduction for the electric valves in the circuit. In those instances it is necessary to employ means for initiating electrical discharges in the various valves at more frequent intervals in order to provide the desired rectification of the alternating current. Furthermore, in polyphase electric valve converting systems, it is frequently desirable to obtain voltage control by shifting the phase of the potentials impressed upon the control members relative to the phase of the potentials appearing between the anodes and cathodes of the several electric valves. In order to obtain the maximum range of voltage control by this method, it becomes necessary under certain conditions to render each of the electric valves conductive at least twice during each cycle of applied potential.

An object of my invention is to provide an improved electric valve translating circuit.

Another object of my invention is to provide an improved control or excitation circuit for electric valves of the gaseous type having immersion-ignitor control members.

A further object of my invention is to provide an improved control circuit for electric valve translating circuits whereby pairs or groups of electric valves are rendered conductive simultaneously and whereby the simultaneous energizations are effected at predetermined times and during predetermined intervals relative to a sequential plan of energization.

A still further object of my invention is to provide an improved control circuit for electric valve translating apparatus wherein a pair of electric valves is rendered conductive simultaneously twice during each cycle of voltage of an associated supply circuit.

In accordance with the illustrated embodiment of my invention, I provide an improved electric valve circuit in which pairs of the electric valves are simultaneously rendered conductive at predetermined times. A plurality of electric valves of the gaseous type having immersion-ignitor control members are employed as a full wave electric valve rectifier for transmitting energy between an alternating current circuit and a direct current circuit through a filter circuit. In order to energize the load circuit, it is necessary that two oppositely disposed valves be conductive at the same time. Under some conditions, for example where the filter circuit is predominately capacitive, it is desirable to render each of the valves conductive twice during each cycle of potential applied between anode and cathode to assure positive starting and operation. I provide an improved excitation system for the electric valves in which a plurality of excitation circuits are employed to control selectively the various electric valves. Each of the excitation circuits is associated with a different pair of electric valves and each simultaneously initiates electrical discharges in two of the electric valves. The simultaneous initiation of electrical discharges is accomplished by employing individual means such as multi-winding transformers associated with each of the control members for the various electric valves. Each of the transformers is provided with two primary windings each of which is associated with a different control circuit and a different oppositely disposed electric valve. In this manner, full wave rectification and an extended range of voltage control are obtained by exciting each electric valve twice during each cycle.

For a better understanding of my invention, reference may be had to the following description taken in connection with the accompanying drawings and its scope will be pointed out in the appended claims.

Figure 2:
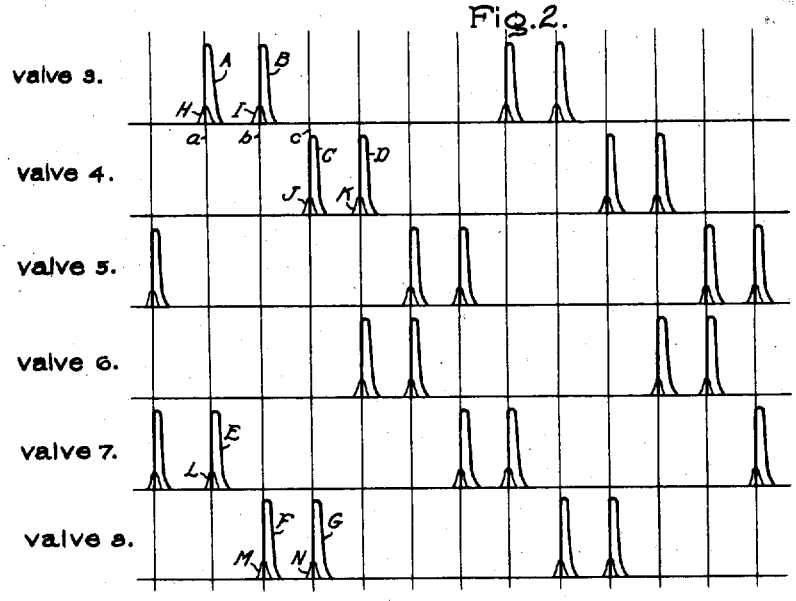
Figure 3:
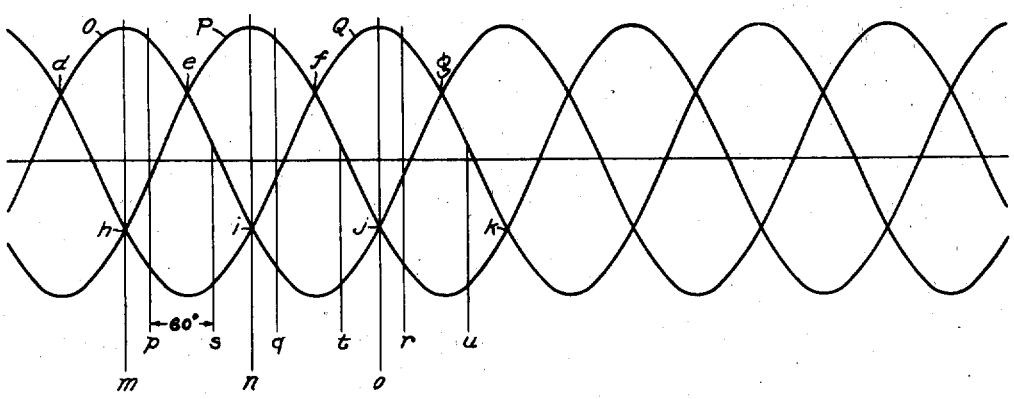

Fig. 1 of the accompanying drawings diagrammatically represents an embodiment of my invention as applied to a full wave rectifier for energizing a direct current circuit from a three phase alternating current circuit, while Figs. 2 and 3 represent certain operating characteristics of the arrangement shown in Fig. 1.

Referring to Fig. 1 of the accompanying drawings, my invention is diagrammatically illustrated as applied to a full wave electric valve rectifier employing two groups of oppositely disposed electric valves for energizing a direct current circuit 1 from a polyphase alternating current circuit 2. Electric valves 3–8, inclusive, preferably of the type employing ionizable mediums such as gases or vapors providing an arc path and each having an anode 9, a mercury pool cathode 10 and an immersion-ignitor control member 11 are energized from the alternating current supply circuit 2 through a transformer 12, having primary windings 13 and secondary windings 14.

A filter circuit including a capacitance 15, inductances 16, and capacitances 17 and resistances 18 is connected between the electric valve aggregate comprising electric valves 3—8 and the direct current load circuit 1. Transformers 19–24, inclusive, having primary windings 25 and 26, 27 and 28, 29 and 30, 31 and 32, 33 and 34, 35 and 36 are employed as individual control means and are associated with the control members 11 of electric valves 3—8, respectively, to render the associated electric valves conductive at predetermined intervals. Resistances 37 are connected across secondary windings of transformers 19—24 to suppress high voltage transients. Resistances 38 and capacitances 39 are connected across the secondary windings 14 of transformers 12 and function as a filter circuit to suppress the transients incident to the rectifier operation.

In order to control the conductivity of electric valves 3—8, I employ a plurality of excitation circuits 40–45, inclusive, preferably of the impulse type. Each of these excitation circuits is associated with a predetermined pair of oppositely disposed electric valves. For example, excitation circuit 40 is associated with electric valves 3 and 7. Likewise, excitation circuits 41—45 are associated with electric valves 4 and 6, 4 and 8, 5 and 7, 5 and 6, and 3 and 8, respectively.

The excitation circuits 40—45 are provided with electronic discharge devices 46—51, respectively, preferably of the gaseous or vapor type. Each of the electronic devices is provided with an anode 52, a cathode 53 and a control member 54. Connected in series with each of the electronic devices 46—51, there is a capacitance 55 shunted by a resistance 56; each of the capacitances 55 is arranged to supply a voltage of peaked wave form to the control members of a different pair of oppositely disposed electric valves through the associated transformers. Current limiting resistances 7 are connected in series with the control members 54 of each of the electronic discharge devices 46—51, inclusive. A capacitance 58 is connected across the cathode 53 and the control member 54 of each of the electric valves 46—51 to minimize the effect of the internal mutual capacitance between the control member 54 and the anode 52. Any suitable bias supplying means, such as batteries 59, is connected to impress a negative voltage upon the respective control members 54 for electronic discharge devices 46—51. An additional control voltage may be impressed on a resistance 60 connected in series with the batteries 59 to modify the control bias voltage. A transformer 61 is used to energize the cathode of electronic discharge devices 46—51 and may be energized from any suitable source such as an auxiliary alternating current supply circuit 62.

The excitation circuits 40—45 are energized from the alternating current supply circuit 2 through any conventional phase shifting arrangement, such as the rotary phase shifting device 63, and through transformers 64 to 69, respectively. In order to provide a source of unidirectional potential for charging the capacitances 55, I employ a plurality of rectifiers including electric valves 70—75, inclusive, which are associated with excitation circuits 40—45, respectively. The electric valves 70—75 may be energized from the auxiliary source of alternating current 62 by means of transformers 76. Cathode heating transformers 77 energize the cathodes for electric valves 70—75 from the alternating current circuit 62. A time delay device 78 may be connected across the primary windings of the cathode heating transformers 77 to delay the closing of the anode circuits of electric valves 70—75 until the cathodes of these valves have attained a predetermined minimum temperature.

Excitation circuit 40 is employed to energize winding 25, of transformer 19 associated with electric valve 3, in series with transformer winding 34 of transformer 23 which is associated with electric valve 7 through conductors 79, 80 and 81. In like manner, the excitation circuits 41—45 are connected to the proper windings of transformers 22 and 20, 20 and 24, 23 and 21, 22 and 21, and 19 and 24. It will be noted that each of the excitation circuits 40—45 is connected to the proper series-connected primary windings of a predetermined pair of transformers associated with oppositely disposed electric valves.

In explaining the operation of the embodiment of my invention diagrammatically illustrated in Fig. 1 of the accompanying drawings, let it be assumed that the group of electric valves 6—8 is supplying unidirectional current to the direct current load circuit 1 from the alternating current supply circuit 2, and the group of electric valves 3—5 returns this current to the supply circuit 2. Furthermore, let it be assumed that the filter circuit including the capacitance 15 is predominately capacitive. To control the conductivity of electric valves 3—8 so that these valves operate as a polyphase full wave rectifier for supplying a capacitive load circuit, I have found it necessary to supply excitation current to the immersion-ignitor control member 11 for each of the electric valves twice during each cycle of applied alternating potential, since the current through the respective electric valves will not be maintained for a sufficient period when the filter circuit is predominately capacitive. Where the load circuit is predominately resistive or inductive, it will be well understood by those skilled in the art that each of the electric valves in an arrangement similar to that diagrammatically shown in Fig. 1 will conduct current for substantially 120 electrical degrees, thereby necessitating only one energization for each electric valve during one cycle of alternating potential. However, where the load circuit is of such a nature that the current is not maintained for a predetermined period, it becomes necessary to render each of the electric valves conductive more than once during each cycle of alternating potential.

The excitation circuits 40—45, which are energized from the alternating current supply circuit 2 through phase shifter 63 and transformers 64—69, effect energization of predetermined pairs of oppositely disposed electric valves at intervals of 60 electrical degrees. The sequence in which the excitation circuits 40—45 supply energizing or exciting current to the respective immersion-ignitor control members 11 is 40, 45, 42, 41, 44 and 43. In accordance therewith, pairs of electric valves will be rendered conductive simultaneously. The sequence in which the pairs of electric valves are rendered conductive is as follows: 3 and 7, 3 and 8, 4 and 8, 4 and 6, 5 and 6, and 5 and 7.

Each of the excitation circuits 40—45 will effect energization of the immersion-ignitor control members 11 to initiate simultaneously electrical discharges in the arc paths of the associated pairs of oppositely disposed electric valves at the proper time. By way of example, the excitation circuit 40 will supply a voltage of suitable wave form to the primary winding 25 of transformer 19 and to the primary winding 34 of transformer 23 to render electric valves 3 and 7, respectively, conductive at a predetermined time. At the proper time the electronic discharge device 46 will be rendered conductive by the control member 54 to effect discharge of the capacitance 55 through a circuit including conductor 79, primary winding 25 of transformer 19, conductor 80, primary winding 34 of transformer 23, conductor 81 and electronic device 46. The capacitance 55 has, of course, been charged previously from the source of alternating current 62 through electric valve 70 and the associated transformer 76. In a similar manner, the excitation circuits, 41—45 will effect energization of the associated pairs of oppositely disposed electric valves in the proper sequence.

Referring now to Fig. 2 of the accompanying drawings, there are represented certain operating characteristics concerning the operation of the electric valve aggregate diagrammatically illustrated in Fig. 1 when applied to an arrangement for energizing a load circuit through a filter circuit which is predominately capacitive. The curves A, B, C, D, E, F and G represent the load current which will flow in the electric valve circuit when the resultant initial effect of the connected circuits is predominately capacitive. The smaller curves H, I, J, K, L, M, and N represent the excitation currents supplied to certain of the electric valves. As previously stated, in order to establish a circuit through the electric valve aggregate for energizing the load circuit it is necessary that at least one pair of oppositely disposed electric valves be conductive at the same time. If the curves A and B be assumed to represent the currents which are supplied to the load circuit through electric valve 3, it is, therefore, necessary that an oppositely disposed electric valve, for example valve 7, be conductive at the same time. If the curve E be considered as the load current flowing through the electric valve 7, the connected circuits will be energized during this interval. Electric valves 3 and 7, respectively, are rendered simultaneously conductive by virtue of the excitation currents represented by curves H and L at the time *a*. Since the filter circuit is predominately capacitive the current represented by curves A and E will not persist to maintain these valves conductive and it is, therefore, necessary that at the time *b* another pair of electric valves, such as valves 3 and 8, be rendered simultaneously conductive. Curves F and M may be assumed to represent the load current and the excitation current, respectively, for electric valve 8. Similarly, at time *c* the electric valve 4 and the electric valve 8 will be rendered conductive simultaneously to effect energization of the load circuit 1. It will, therefore, be noted that the excitation currents represented by curves H—N render the electric valves conductive in a proper sequence and that each of the electric valves is rendered conductive twice during each 360 electrical degrees and that the interval between these energizations is substantially 60 electrical degrees.

By virtue of my invention, I provide an arrangement for obtaining a greater range of voltage control of electric valve circuits by phase shift control, that is by advancing or retarding the phase of the voltages impressed upon the control members relative to the voltages appearing between the associated anodes and the cathodes of the respective electric valves.

Referring now to Fig. 3 of the accompanying drawings, certain operating characteristics of my invention are illustrated when the embodiment of my invention diagrammatically shown in Fig. 1 is energizing a resistive load and is operating with the phase of the control voltages considerably retarded relative to the voltages impressed between the anodes and cathodes of the several electric valves. Let it be assumed that the sine curves O, P and Q represent the voltages impressed upon the electric valves by the alternating current supply circuit 2. As will be understood by those skilled in the art, when there is substantial phase coincidence between the voltages impressed upon the respective control members 11 and the voltages impressed upon the anodes of the electric valves, each electric valve will conduct current for substantially 120 electrical degrees. For example, electric valves 3, 4 and 5 will conduct current during the intervals *d—e*, *e—f*, and *f—g*, respectively, and the electric valves 8, 6 and 7 will conduct current during the intervals *h—i*, *i—j*, and *j—k*, respectively. If the phase of the voltage impressed upon the control members 11 is retarded, the electric valves will continue to operate over a corresponding portion of the curves until a certain predetermined maximum phase displacement is obtained. This maximum displacement is represented by the angular displacements *m*, *n* and *o*. For angular displacements less than the angular displacements represented by the points *m*, *n*, and *o*, it is necessary to excite each of the electric valves only once during each 360 electrical degrees. However, if it is desired to obtain greater voltage control by retarding the control voltages by a still greater angle into the quadrant beyond the 90° lagging position, it is necessary to excite each of the electric valves twice during each 360 electrical degrees. If the voltages impressed upon the respective control members 11 of electric valves 3—8 are retarded by the phase shifter 63 to angles corresponding to points *p*, *q* and *r*, it becomes necessary to render each of the valves conductive twice during each cycle. For example, if electric valves 3 and 7 are rendered conductive at the time *p*, these valves will supply current to the load circuit 1, assuming a resistive load, during the interval *p—e*. At the time *e* since the net voltage impressed upon the load circuit is zero, the electric valves 3 and 7 will become non-conductive. Hence at the time *s* electric valves 3 and 8 must be rendered conductive and these valves will conduct current to the load circuit during the interval *s*—*i*. At the time *i* electric valves 3 and 8 will become non-conductive. In like manner, at the times *q*, *t*, *r* and *u* the pairs of electric valves 4 and 8, 4 and 6, 5 and 6, 5 and 7, respectively, must be rendered conductive to obtain this increased range of voltage control. It will be noted that to obtain this increased voltage control, it is necessary to render each of the electric valves conductive twice during each cycle and that these successive energizations for each valve during any one cycle occur at 60 electrical degree intervals.

In view of the above comments and with particular reference to the operating characteristics of Fig. 3, it will be appreciated that pairs of electric valves are rendered simultaneously conductive more than once during each half cycle of voltage of the alternating current supply circuit. Furthermore, it will be understood that energizing impulses of current are transmitted to the control members 11 of each of the electric valves 3—8 twice during a half cycle of voltage of the alternating current supply circuit 2.

Although my invention has been explained relative to an electric valve rectifying system employing electric valves of the gaseous type having immersion-ignitor control members, it should be understood that my invention in its broader aspects may be applied to electric valve translating circuits generally irrespective of the type of circuit or nature of the gaseous electric valves employed.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit which is predominately capacitive, electric valve means of the gaseous type for interconnecting said circuits and including a plurality of arc paths each having a control member associated therewith, said load circuit being of a nature which does not permit the continuous conduction of current during the entire normal interval of conduction of each of said arc paths established by the voltage of said supply circuit, and means for selectively energizing said control members to render predetermined arc paths of said arc paths simultaneously conductive at a number of predetermined different intervals during each cycle of potential of said alternating current circuit to permit an extended range of control of an electrical condition of said load circuit.

2. In combination, an alternating current circuit, a load circuit having a predominately capacitive admittance, electric valve translating apparatus for interconnecting said circuits and including a plurality of arc paths each having a control member associated therewith, said load circuit being of a nature which does not permit the continuous conduction of current during the entire normal interval of conduction of each of said arc paths established by the voltage of said supply circuit, means for impressing potentials on said control members to render predetermined arc paths of said arc paths simultaneously conductive more than once during each half cycle of potential of said alternating current circuit, and means for controlling the phase of said potentials to permit an extended range of control of an electrical condition of said load circuit.

3. In combination, a supply circuit, a load circuit, and electric translating apparatus interconnecting said circuits comprising a pair of arc paths each having a control member, individual means associated with each control member for effecting energization thereof, and an excitation circuit for energizing said individual means in series to effect simultaneous initiation of electrical discharges in said arc paths.

4. In combination, a supply circuit, a load circuit, and electric translating apparatus interconnecting said circuits comprising a pair of electric valves each having an immersion-ignitor control member for controlling the conductivity of the associated electric valve, individual means for effecting energization of said control members, and an excitation circuit for energizing said individual means in series to supply currents simultaneously to said control members.

5. In combination, an alternating current circuit, a load circuit, translating apparatus interconnecting said circuits and comprising one group of electric valves for transmitting current to said load circuit and a second group of electric valves for returning said current from said load circuit, and means for rendering simultaneously conductive one valve in said one group of valves and another valve in said second group and subsequently rendering simultaneously conductive said one valve in said one group and a different valve in said second group during each cycle of potential of said alternating current circuit.

6. In combination, an alternating current supply circuit, a load circuit, translating apparatus interconnecting said circuits and comprising one group of electric valves for transmitting current to said load circuit and a second group of electric valves for returning said current from said load circuit, and a plurality of excitation circuits for rendering one pair of electric valves simultaneously conductive during one half cycle of potential of said alternating current circuit and for subsequently rendering simultaneously conductive another pair of electric valves during the same half cycle.

7. In combination, a supply circuit, a load circuit, and electric translating apparatus interconnecting said circuits comprising a pair of electric valves each having an immersion-ignitor control member for controlling the conductivity of the associated electric valve, individual means associated with each of said control members for energizing said control members, and an excitation circuit for energizing said individual means in series to render said valves conductive simultaneously.

8. In combination, a supply circuit, a load circuit, and electric translating apparatus interconnecting said circuits comprising a pair of electric valves each having an immersion-ignitor control member for controlling the conductivity of the associated electric valve, a pair of transformers each associated with a different one of said control members and having primary windings connected in series relation and an excitation circuit including a capacitance, a source of direct current for charging said capacitance and an electronic discharge device for discharging said capacitance through said series-connected primary windings to render said electric valves conductive simultaneously.

9. In combination, a supply circuit, a load circuit, a group of electric valves each having a control member and being connected to transmit current from said supply circuit to said load circuit, a group of electric valves each having a control member and being connected in a sense opposite to that of said first-mentioned group of electric valves for returning said current from said load circuit to said supply circuit, a plurality of transformers each associated with a different one of said electric valves for energizing said control members and having two primary windings, each winding being connected in series with a primary winding of a transformer associated with a different oppositely disposed electric valve, and a plurality of excitation circuits each being arranged to render simultaneously conductive a different pair of oppositely disposed electric valves through the respective series-connected primary windings.

10. In combination, an alternating current supply circuit, a load circuit, a group of electric valves each having a control member and being connected to transmit current from said supply circuit to said load circuit, a group of electric valves each having a control member and being connected in a sense opposite to that of said first-mentioned group of electric valves for returning said current from said load circuit to said supply circuit, a plurality of transformers each associated with a different one of said electric valves for energizing said control members and each having two primary windings, each winding being connected in series relation with a primary winding of a transformer associated with a different oppositely disposed electric valve, and a plurality of excitation circuits each being arranged to render conductive simultaneously a different pair of oppositely disposed electric valves through said series-connected windings and being arranged to render each of said valves conductive twice during each cycle of alternating potential.

11. In combination, a polyphase alternating current supply circuit, a load circuit, a group of electric valves each having a control member and each being connected to transmit current from said supply circuit to said load circuit, a group of electric valves each having a control member and being connected in a sense opposite to that of said first-mentioned group of electric valves for returning said current from said load circuit to said supply circuit, a plurality of transformers each associated with a different one of said electric valves for energizing said control members and each having two primary windings, each winding being connected in series relation with a primary winding of a transformer associated with a different oppositely disposed electric valve, and means for controlling the conductivity of each of said electric valves by retarding the phase of voltages impressed on the control members comprising a plurality of excitation circuits each being associated with the transformers of a different pair of oppositely disposed electric valves for rendering conductive said pairs of valves in a predetermined sequence and for rendering each of said electric valves conductive twice during each cycle of alternating potential.

12. In combination, an alternating current supply circuit, a load circuit, translating apparatus interconnecting said circuits and comprising one group of electric valves for transmitting current to said load circuit and a second group of electric valves for returning said current from said load circuit, said electric valves each being of the type employing an ionizable medium and each having a control member for rendering the valves conductive, and a plurality of excitation circuits for energizing the control members and comprising means for selectively advancing and retarding the times of energization of said control members relative to the voltage of said supply circuit to control the voltage impressed on said load circuit and means for rendering simultaneously conductive one valve in said one group of valves and a valve in said second group of valves and subsequently rendering simultaneously conductive said one valve in said one group and a different valve in said second group during each cycle of voltage of said supply circuit.

13. In combination, an alternating current supply circuit, a direct current load circuit, electric translating apparatus connected to said supply circuit and comprising a plurality of electric valve means each having a control member for controlling the conductivity thereof, a filter circuit having a predominately capacitive admittance connected between said electric valve means and said load circuit, said filter circuit being of a nature which does not permit the continuous conduction of current during the entire normal interval of conduction of each of said electric valve means established by the voltage of said supply circuit, and means for selectively energizing said control members to render predetermined electric valves of said electric valves simultaneously conductive at a number of predetermined different intervals during each half cycle of potential of said alternating current circuit to permit an extended range of control of the voltage of said load circuit.

HAROLD W. LORD.